United States Patent
Nakagawa

(10) Patent No.: US 8,819,016 B2
(45) Date of Patent: Aug. 26, 2014

(54) APPARATUS, METHOD, AND PROGRAM FOR STRUCTURING VISUALIZATION OBJECT DATA; AND APPARATUS, METHOD, AND PROGRAM FOR VISUALIZING VISUALIZATION OBJECT DATA

(75) Inventor: Machiko Nakagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1235 days.

(21) Appl. No.: 12/695,306

(22) Filed: Jan. 28, 2010

(65) Prior Publication Data
US 2010/0194766 A1    Aug. 5, 2010

(30) Foreign Application Priority Data

Jan. 30, 2009  (JP) ................................ 2009-021000

(51) Int. Cl.
*G06F 17/30* (2006.01)

(52) U.S. Cl.
USPC ............ 707/737; 382/224; 345/440; 345/581

(58) Field of Classification Search
None
See application file for complete search history.

(56) References Cited

U.S. PATENT DOCUMENTS

| | | | |
|---|---|---|---|
| 5,159,647 A * | 10/1992 | Burt | 382/103 |
| 6,041,143 A | 3/2000 | Chui et al. | |
| 8,379,037 B1 * | 2/2013 | Praun et al. | 345/586 |
| 2002/0191034 A1 * | 12/2002 | Sowizral et al. | 345/854 |
| 2005/0035883 A1 * | 2/2005 | Kameda et al. | 340/995.1 |
| 2007/0058871 A1 * | 3/2007 | Deligiannakis et al. | 382/224 |
| 2008/0317352 A1 * | 12/2008 | Ros et al. | 382/191 |

FOREIGN PATENT DOCUMENTS

| | | |
|---|---|---|
| JP | 5-73649 A | 3/1993 |
| JP | 11-73526 A | 3/1999 |
| JP | 2002-511686 | 4/2002 |
| JP | 2005-056075 A | 3/2005 |
| WO | WO-2007/128580 A1 | 11/2007 |

OTHER PUBLICATIONS

Japanese Office Action mailed Oct. 23, 2012 for corresponding Japanese Application No. 2009-021000, with Partial English-language Translation.

* cited by examiner

*Primary Examiner* — James Thompson
*Assistant Examiner* — David H Chu
(74) *Attorney, Agent, or Firm* — Fujitsu Patent Center

(57) ABSTRACT

A method of visualizing visualization object data by creating a visualized image, including setting a visualization requirement; determining each node from a root node to a leaf node as a selected node, and determining whether or not the selected node satisfies the visualization requirement; registering nodes in a selected-node list for creating a visualization image when the selected node is a leaf node or has been determined to satisfy the visualization requirement, while replacing the selected node with child nodes of the selected node, and by making the child nodes new candidates for the selected node when the selected node has been determined not to satisfy the visualization requirement; outputting the selected-node list when there are no selected nodes to be processed; and creating the visualized image based on the visualization object data and node coordinate data associated with the respective nodes registered in the selected-node list.

3 Claims, 14 Drawing Sheets

FIG. 4

```
DATA INITIAL INFORMATION

Data Structure:
Structured Grid
Data Size:
500*500*500
Data Set:
Node Data: Vector
Element Data: Scalar
Degree of Importance:
   • Maximum Vector Magnitude
   • Minimum Vector Magnitude Tree Structure
Number of Levels: 3
Octree
```

FIG. 5A

①  ROOT NODE

```
//node coordinate data
xmin 0 xmax 500 ymin 0 ymax 500
zmin 0 zmax 500
//node data size
int sizeX 125
int sizeY 125
int sizeZ 125
//current data header address
int * vector_data
int * scalar_data
//degree of importance
double NmagMax
double NmagMin
//child node header address
int * child_add [8]
```

FIG. 5B

②  NODE (LEVEL 2)

```
//node coordinate data
xmin 0 xmax 250 ymin 0 ymax 250
zmin 250 zmax 500
//node data size
int sizeX 125
int sizeY 125
int sizeZ 125
//current data header address
int * vector_data
int * scalar_data
//degree of importance
double NmagMax
double NmagMin
//parent node header address
int * parent_address
//child node header address
int * child_address [8]
```

FIG. 5C

③  LEAF NODE (LEVEL 3)

```
//node coordinate data
xmin 0 xmax 125 ymin 0 ymax 125
zmin 375 zmax 500
//node data size
int sizeX 125
int sizeY 125
int sizeZ 125
//current data header address
int * vector_data
int * scalar_data
//degree of importance
double NmagMax
double NmagMin
//parent node header address
int * parent_address
```

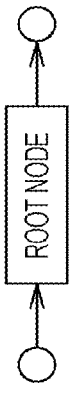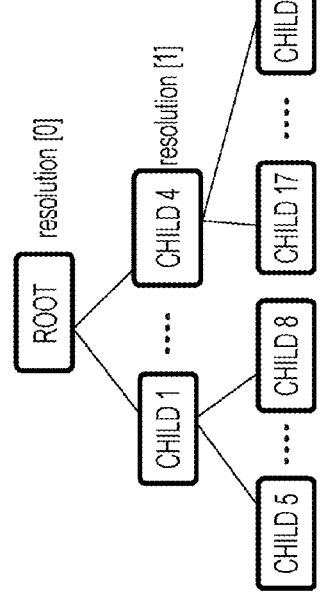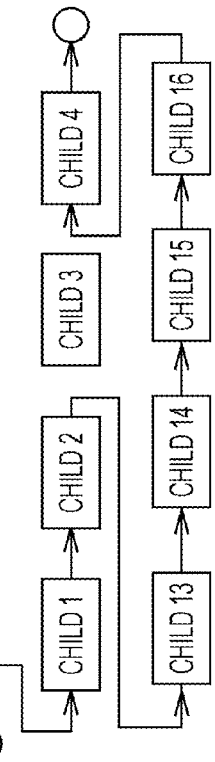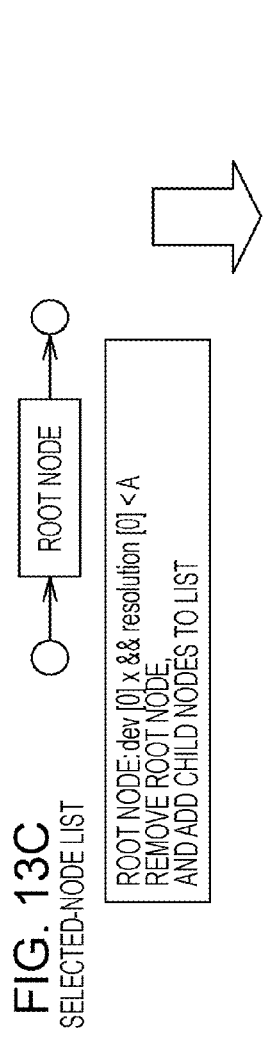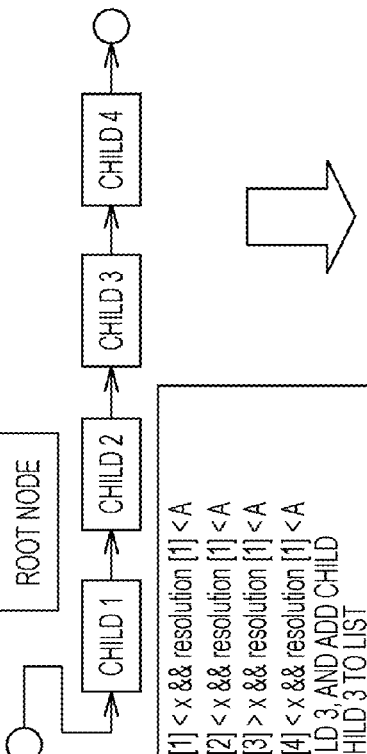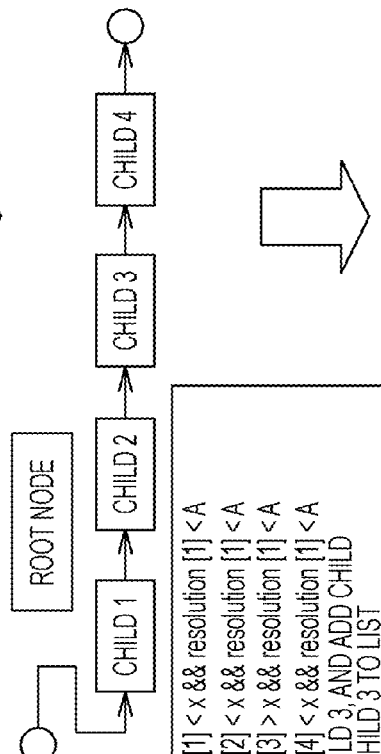

FIG. 13A
- VISUALIZATION METHOD
  VOLUME RENDERING
- VISUALIZATION REQUIREMENT
  RESOLUTION MUST BE A OR HIGHER
  IF VARIANCE IS x OR MORE

FIG. 13B

FIG. 13C
SELECTED-NODE LIST
ROOT NODE: dev [0] x && resolution [0] < A
REMOVE ROOT NODE,
AND ADD CHILD NODES TO LIST FIG. 13D
SELECTED-NODE LIST
CHILD 1: dev [1] < x && resolution [1] < A
CHILD 2: dev [2] < x && resolution [1] < A
CHILD 3: dev [3] > x && resolution [1] < A
CHILD 4: dev [4] < x && resolution [1] < A
REMOVE CHILD 3, AND ADD CHILD
NODES OF CHILD 3 TO LIST

FIG. 13E
SELECTED-NODE LIST

APPARATUS, METHOD, AND PROGRAM FOR STRUCTURING VISUALIZATION OBJECT DATA; AND APPARATUS, METHOD, AND PROGRAM FOR VISUALIZING VISUALIZATION OBJECT DATA

CROSS-REFERENCE TO RELATED APPLICATION

This application is based upon and claims the benefit of priority of the prior Japanese Patent Application No. 2009-21000, filed on Jan. 30, 2009, the entire contents of which are incorporated herein by reference.

FIELD

The disclosed technique relates to a visualization technique for visualizing visualization object data.

BACKGROUND

To acquire knowledge from numerical data obtained by observation or measurement, a visualization technique for visualizing the data is used. However, the amount of visualization object data has increasingly become larger due to development of information science and technology, and hence, a tremendous amount of time and computation is required for visualization processing if no appropriate measures are taken. Consequently, there exists a problem in that the time for visualization processing has increased so much that visual representation is difficult. There also exists a problem in that even if a visualization processing result is obtained, desired information is buried in the large amount of information of the result. Hence, a method is required that allows a necessary result to be obtained with less computation time for the visualization of large scale data.

A technique that satisfies this requirement may be a method of decreasing computation time itself by means of parallel processing of visualization, by increasing the number of computers.

Another technique which can be used is a method of decreasing the amount of computation itself by thinning out, or reducing, information from the original data before visualization computation. Methods of information decimation include decreasing the total amount of information of visualization object data and extracting only necessary portions to be subjected to computation for visualization processing.

A general technique for large scale visualization processing is executing a visualization process in accordance with an objective, for visualization object data after reduction, thereby visualizing necessary information.

Techniques regarding visualization are disclosed in, for example, Japanese Unexamined Patent Application Publication (Translation of PCT Application) No. 2002-511686 and Japanese Unexamined Patent Application Publication No. 2005-56075.

Many techniques for reducing the amount of information for visualization are known and are generally called "data reduction."

Data reduction is generally a non-reversible process, and to change the resolution of data after reduction, data with modified resolution needs to be restructured using the original data. It can be said that data reduction is a technique for extracting only necessary information such as desired elements or aspects in accordance with an objective. Hence, data reduction has a problem in that for every visualization process a restructuring process needs to be executed to obtain data appropriate for the objective.

In addition, although data reduction makes it easy to extract knowledge from the visualization result of large scale data, there is a problem in that important information may be discarded due to a lack of necessary and sufficient precision in the result.

Such problems described above make it difficult to perform visualization and analysis for large scale data from various perspectives.

An object of the disclosed technique is to allow required information to be efficiently acquired from visualization object data, and to allow visualization of large scale data from various viewpoints to be easily realized.

SUMMARY

According to an embodiment, a method of visualizing visualization object data by creating a visualized image including setting a visualization requirement, determining each node from a root node to a leaf node as a selected node, and determining whether or not the selected node satisfies the visualization requirement, registering nodes in a selected-node list for creating a visualization image when the selected node is a leaf node or has been determined to satisfy the visualization requirement, while replacing the selected node with child nodes of the selected node, and by making the child nodes new candidates for the selected node when the selected node has been determined not to satisfy the visualization requirement, outputting the selected-node list when there are no selected nodes to be processed, and creating the visualized image based on the visualization object data and node coordinate data associated with the respective nodes registered in the selected-node list

BRIEF DESCRIPTION OF DRAWINGS

FIG. 4 illustrates an example data configuration of data initial information;

FIGS. 5A to 5C illustrate example data configurations of an address table;

FIGS. 13A to 13E illustrate an operation for selecting nodes to be used;

DESCRIPTION OF EMBODIMENTS

Hereinafter, embodiments of the present invention are described in detail.

Figure 1A:
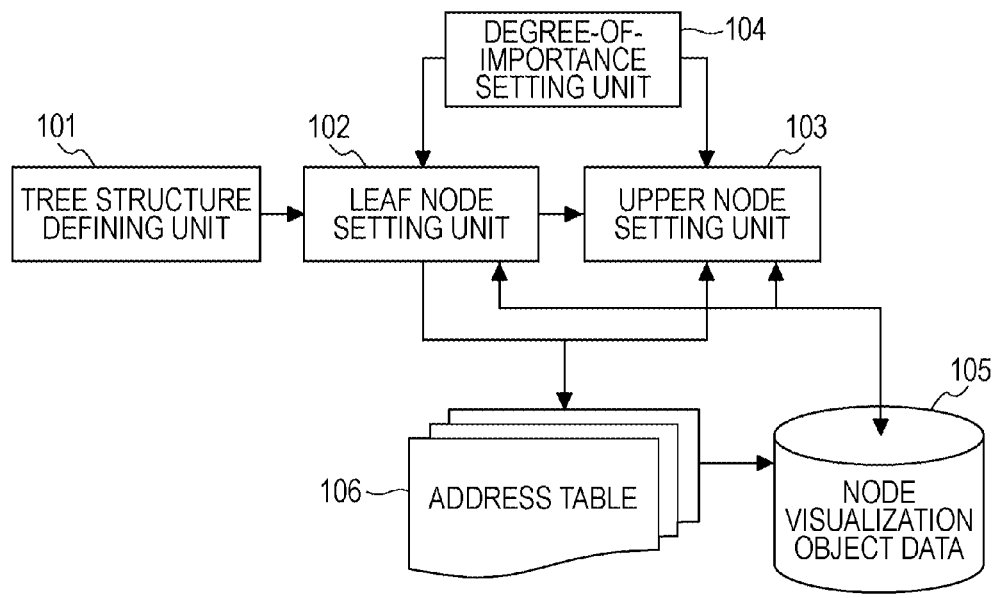
FIGS. 1A and 1B are block diagrams illustrating a structuring apparatus and a visualization apparatus according to an embodiment of the invention.
Figure 1B:
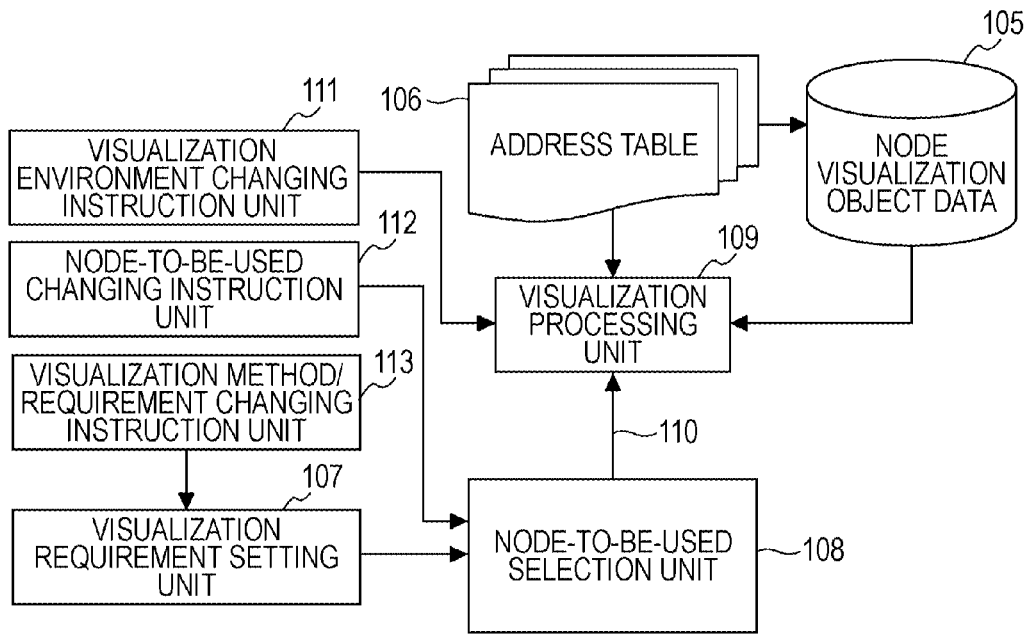

FIG. 1A illustrates a diagram of a structuring apparatus for structuring visualization object data according to an embodiment. FIG. 1B illustrates a diagram of a visualization apparatus for visualizing structured visualization object data according to the embodiment. The structuring apparatus illustrated in FIG. 1A and the visualization apparatus illustrated in FIG. 1B may be configured in the same computer, such as the computer illustrated in FIG. 15, or may be configured in different computers. When the structuring apparatus and visualization apparatus are configured in different computers, node visualization object data 105 is provided in the respective apparatuses.

The structuring apparatus illustrated in FIG. 1A includes a tree structure defining unit 101, a leaf node setting unit 102, an upper node setting unit 103, and a degree-of-importance setting unit 104. The structuring apparatus structures visualization object data into a tree structure. The structuring apparatus includes, as data, the node visualization object data 105 and an address table 106.

The visualization apparatus illustrated in FIG. 1B includes a visualization requirement setting unit 107, a node-to-be-used selection unit 108, and a visualization processing unit 109. The visualization apparatus visualizes structured visualization object data.

In the present embodiment, visualization object data is made to have a tree structure in preprocessing. Generally, visualization object data has numerical data and three-dimensional position data indicating the positions at which numerical data are arranged in a three-dimensional rendering coordinate space. Structuring data into a tree structure (tree structuring) is performed for either or both of the numerical data and the position data. When tree structuring of visualization object data is performed based on the position data, the visualization region is halved respectively along the x, y, and z axes in the case of three-dimensional visualization object data, for example. When the tree structuring of the visualization object data is performed based on the numerical data, neighboring visualization object data having nearly the same numerical values are divided among nodes under the same node, for example.

Figure 2:
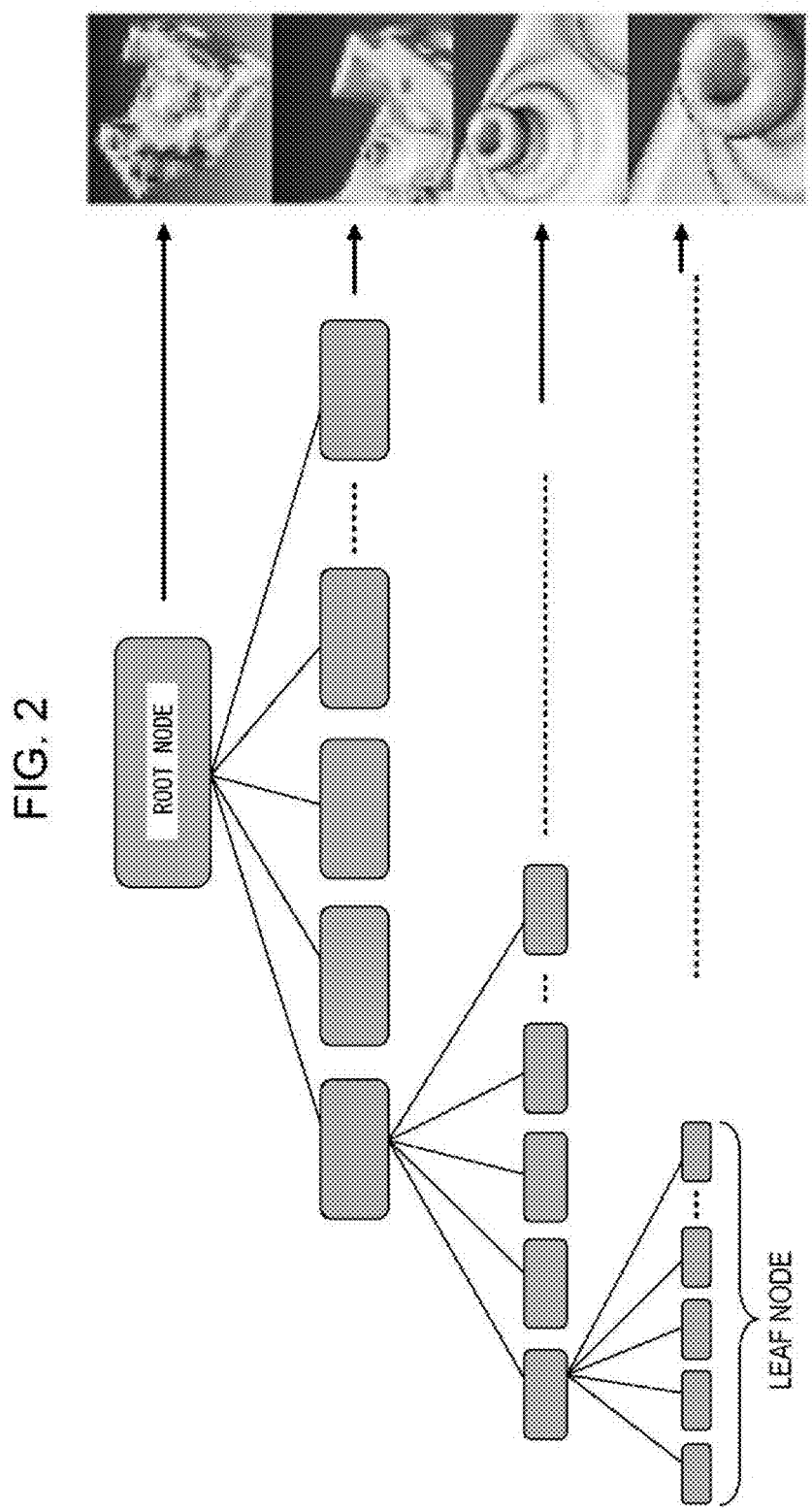
FIG. 2 illustrates a tree structure of visualization object data and visualized images corresponding to respective levels of the tree structure.

FIG. 2 illustrates a tree structure of visualization object data and examples of visualized images corresponding to respective levels of the tree structure in a case where three-dimensional CAD data of an industrial product is used as the visualization object data.

In the example illustrated in FIG. 2, local region data having a higher degree of resolution is associated with nodes at a deeper level of the tree, i.e., at a lower level of the tree structure. Wide region data having a lower degree of resolution is associated with nodes at a higher level of the tree structure, i.e., at a level relatively closer to the root node at the top level. In the present embodiment, the data associated with these respective nodes are called "node visualization object data."

The original visualization object data of respective local regions, in other words, the node visualization object data 105, is associated with leaf nodes corresponding to the bottom level of the tree structure. Visualization object data obtained by combining all the node visualization object data 105 associated with the respective leaf nodes is equal to the original high resolution visualization object data.

At the nodes other than nodes at the bottom level corresponding to the leaf nodes, node visualization object data associated with the child nodes at the lower level of the selected node is subjected to data reduction. In this way, node visualization object data for a wide region including respective local regions corresponding to the child nodes is generated. The generated node visualization object data is associated with the selected parent node, i.e., the node located at the level immediately above the child level.

The root node is associated with node visualization object data having the lowest resolution and representing the whole region of the visualization object data as illustrated in FIG. 2.

Here, associating the node visualization object data with a node means that a pointer to a memory address at which the node visualization object data associated with the node is stored in the management data corresponding to the node. In the present embodiment, the management data corresponding to a node is stored in the address table 106 illustrated in FIG. 1, which will be described later.

In the present embodiment, when visualization object data with a given resolution is required, the node visualization object data associated with the nodes of a level corresponding to the resolution are read and the visualized image is created.

When the resolution of only a specific region is to be enhanced, a visualized image is created in such a manner that the node visualization object data associated with the nodes of deeper (lower) levels are read only for the specific region. And after magnification ratio matching, the read node visualization object data is combined with the node visualization object data 105 of the other levels.

In this manner, the present embodiment makes it possible to create a visualized image by combining the node visualization object data of any nodes of any levels in accordance with a requirement of a user.

In the present embodiment, to allow a user to easily specify requirements, each node holds a degree of importance as a property which is set by a user for the node or visualization object data, in addition to the tree structuring of visualization object data. The degree of importance may be determined in accordance with the numerical data such as values of pressure or flow velocity associated with a node and the node coordinate data indicating the display position of the local region corresponding to the node. By setting a degree of importance for each node, and giving a high degree of importance to the display position of a node corresponding to a certain display position, it becomes possible to select lower level nodes corresponding to the display position and display high resolution information at the display position. Such processing may be useful particularly for visualization of medical data and the like.

The operation of the present embodiment for realizing the above operation will be described in detail below.

First, the operation of the structuring apparatus illustrated in FIG. 1A is described in detail.

Figure 3:
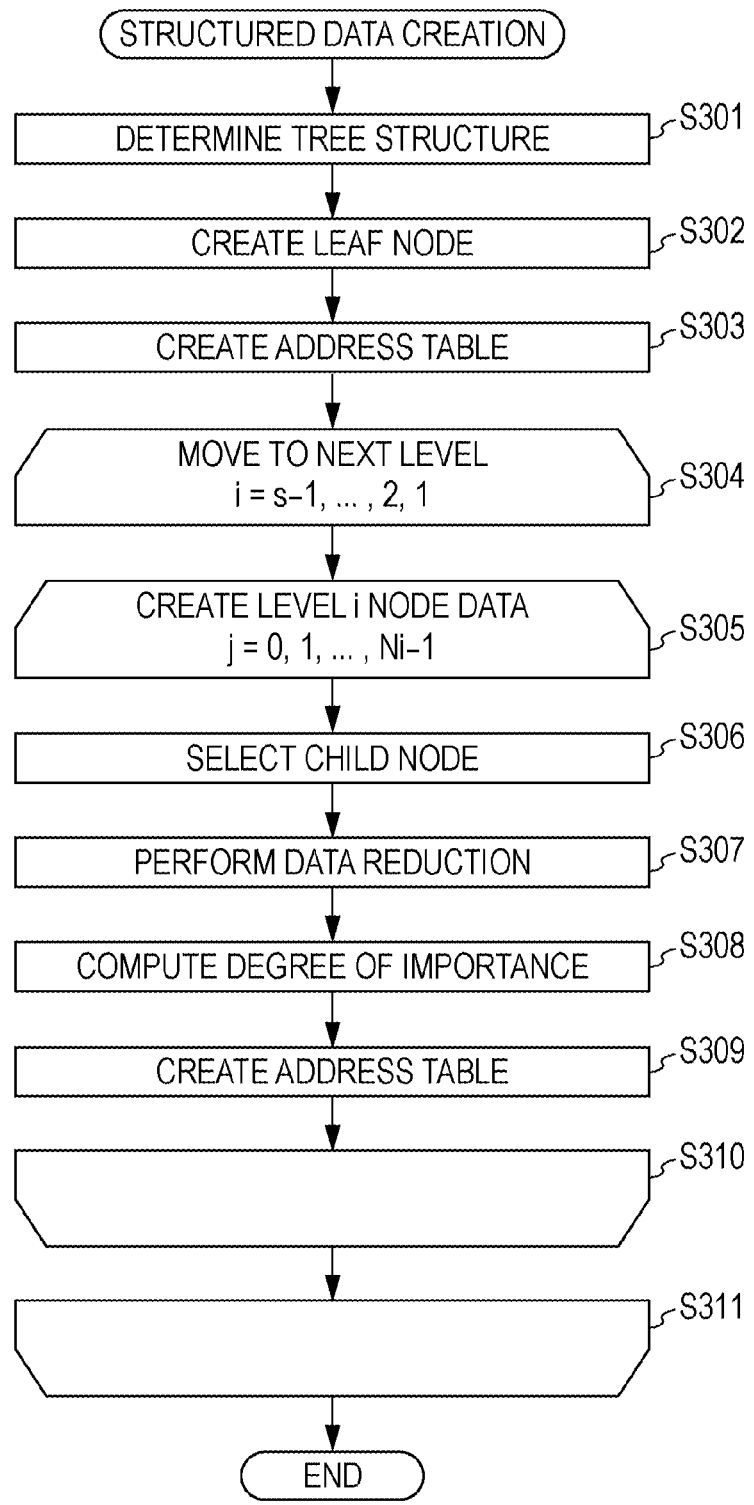
FIG. 3 is a flowchart of an operation for structured data creation processing.

FIG. 3 illustrates a flowchart of the processing for creating structured data executed by the structuring apparatus illustrated in FIG. 1A. Hereinafter, descriptions are made with reference to the respective units illustrated in FIG. 1A and the respective steps illustrated in FIG. 3.

The tree structure defining unit 101 defines the tree structure of visualization object data (S301).

FIG. 4 illustrates an example data configuration of data initial information, which is the information defining the tree structure generated by the tree structure defining unit 101.

A "Data Structure" item is an item specifying the type of tree structure. In the example illustrated in FIG. 4, the "Data Structure" item specifies that the tree structure is created in a type called "Structured Grid".

A "Data Size" item is an item indicating the data size of the original visualization object data. In the example illustrated in FIG. 4, the "Data Size" item specifies that the original visualization object data is three-dimensional data having a size of 500×500×500 pixels.

A "Data Set" item is an item indicating the type of data to be set. In the example illustrated in FIG. 4, the "Data Set" item specifies that vector data "Vector" is held as node data and scalar data "Scalar" is held as element data. Node data means data at nodes of pixels corresponding to each node of a tree structure, and element data means data at elements of respective pixels, e.g., data located at the center of a grid. The data at the nodes of a tree structure correspond to numerical data of visualization object data. Vector data is, for example, three-dimensional data having a three-dimensional direction at each display position. Scalar data is, for example, data such as temperature data having no direction at each display position.

A "Degree of Importance" item indicates an item to be set as a degree of importance for each node. In the example illustrated in FIG. 4, the "Degree of Importance" items specify that, as the elements for specifying a degree of importance, the maximum and minimum values of the magnitude of a vector, "Vector magnitude", are held. A user may set degrees of importance for several types of any information as desired. Examples of information set as a degree of importance include the average or maximum/minimum of a certain element of the node. Holding these numerical information pieces as the degrees of importance allows for selection in a color table in accordance with the degrees of importance at, for example, the time of visualization. For instance, it becomes possible that the first specific color in the color table is selected for use in rendering when a high degree of importance is set or a low degree of importance is set. Other examples of operations include a case where by specifying a standard deviation or variation as the degree of importance, a node with a setting of a high degree of importance is selected, or the resolution of the visualization result is increased by using the node visualization object data corresponding to the child nodes of the selected node.

A "Tree Structure" item is an item indicating the details of a tree structure. In the example illustrated in FIG. 4, the "Tree Structure" items specify that the tree structure is made up of three levels and is an octree. The address of the address table 106 described later is held here. Here, an octree is a tree in which each node has up to eight child nodes, and is used to represent, for example, a case where one cubic region is divided into eight child cubic regions by halving each axis of the three-dimensional cubic region.

In addition, the data initial information may include the number of child nodes that may be held by the parent node, and information specifying a method of data reduction used in generation of a parent node from child nodes, in accordance with the type or amount of the visualization object data. The method of data reduction varies with the objective. Generally, the amount of the visualization object data of a parent node is decreased by selecting a characteristic value, such as the average, maximum, or minimum, as a representative value of the node visualization object data 105 arranged in the vicinity of one another among a plurality of child nodes of the parent node, and then making the representative value be the value of the node visualization object data 105 of the parent node.

After the tree structure defining unit 101 has defined the tree structure as described above, the leaf node setting unit 102 divides the original high resolution visualization object data corresponding to the whole amount of visualization object data into visualization object data of a plurality of local regions in accordance with the number of the leaf nodes at the bottom level of the tree structure (S302). Then for each of the divided local regions the visualization object data of the divided local regions and the information indicating the position of the divided local regions in the visualization object are associated with the respective leaf node as the node visualization object data and node coordinate data of the leaf node corresponding to the local region. Further, the degree-of-importance setting unit 104 sets the importance data indicating the degree of importance of the leaf node based on the node visualization object data 105 or the node coordinate data associated with the leaf node in accordance with the definition of the "degree of importance" items illustrated in FIG. 4, and associates the setting with the leaf node.

Figure 8:
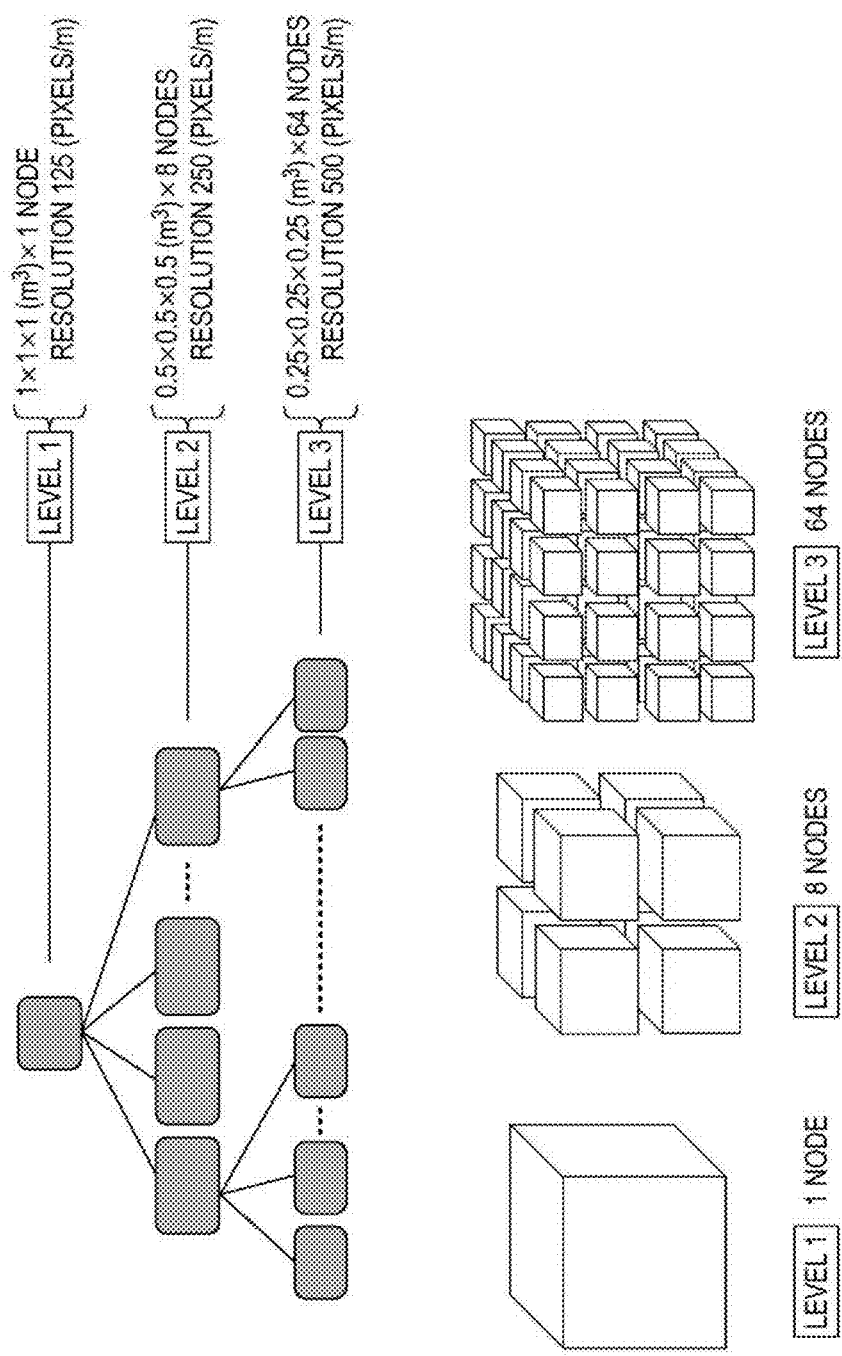
FIG. 8 illustrates an operation of an embodiment.

For instance, it is assumed that the original visualization object data is data obtained by the measurement of a 1 m (meter)×1 m×1 m cube region with a resolution of 500 pixels/m. In the case of the definition of a tree structure illustrated in FIG. 4, an octree is employed. Hence, as illustrated in FIG. 8, the visualization region represented by the original visualization object data is divided by a total of 2×2×2=8 corresponding to halving each axis of the three dimensions and represented by eight nodes, at the second level. At the third level, each axis is further divided by two and a total of 4×4×4=64 nodes exist. Since the number of levels is set to three in the example illustrated in FIG. 4, the third level corresponds to a leaf level, and the number of the leaf nodes is 64. Hence, in the case of the example illustrated in FIG. 8, the leaf node setting unit 102 generates 64 pieces of local regional visualization object data corresponding to the 64 leaf nodes, by dividing the original visualization object data obtained by the measurement of a 1 m (meter)×1 m×1 m cube region with a resolution of 500 pixels/m by 4×4×4=64. The node visualization object data 105 of each leaf node obtained by this operation is data having a size of 125×125×125 pixels representing a 0.25 m×0.25 m×0.25 m local region cube with a resolution of 500 pixels/m, as illustrated in FIG. 8.

Figure 6:
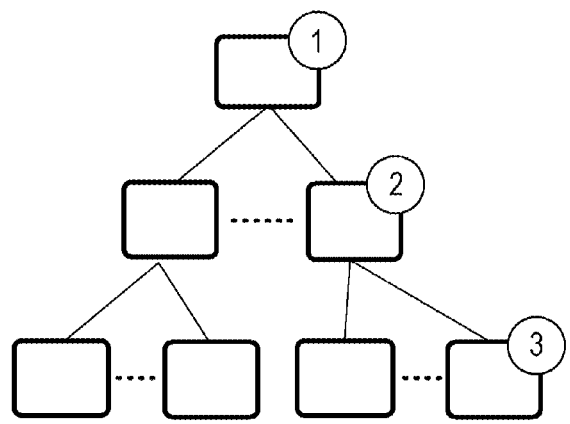
FIG. 6 is an explanatory illustration of a tree structure.

To store the node visualization object data 105 of a leaf node, the leaf node setting unit 102 creates the address table 106 associated with each leaf node denoted by 3 in FIG. 6 (S303). FIGS. 5A to 5C illustrate example data configurations of the address table 106, and FIG. 5C illustrates an example data configuration of the address table 106 created by the leaf node setting unit 102.

In FIG. 5C, "//node coordinate data" indicates the position of the local region of a visualization object associated with the leaf node. The example illustrated in FIG. 5C indicates that the local region of the leaf node has the following ranges: on the x-axis, the minimum "xmin" is 0 and the maximum "xmax" is 125; on the y-axis, the minimum "ymin" is 0 and the maximum "ymax" is 125; on the z-axis, the minimum "zmin" is 375 and the maximum "zmax" is 500.

"//node data size" indicates the data size of the node visualization object data 105 that represents the local region associated with the leaf node, using three int (integer) variables: sizeX, sizeY, and sizeZ. The example illustrated in FIG. 5C indicates that the node visualization object data 105 associated with the leaf node is 125×125×125 pixel data.

Figure 7:
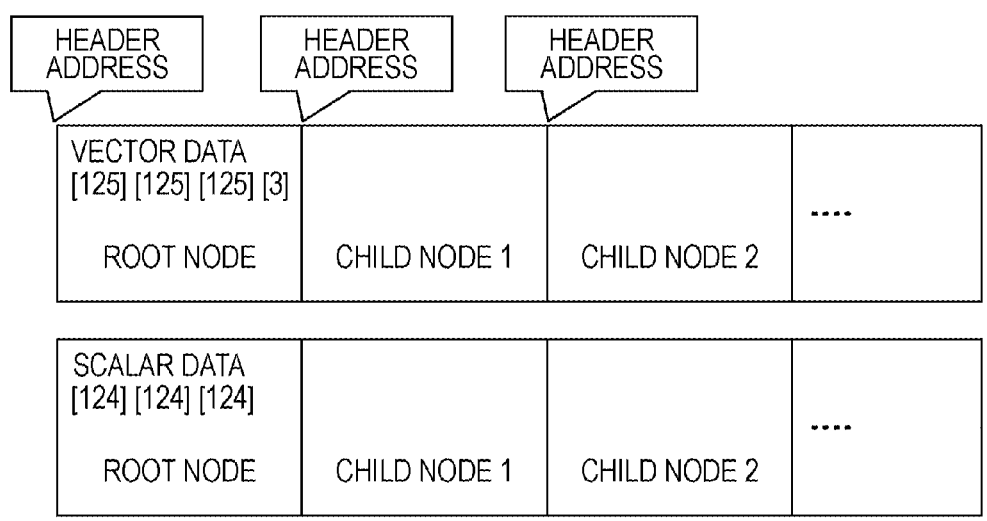
FIG. 7 illustrates an example data configuration of vector data and scalar data.

"//current node data header address" indicates, using a pointer variable, the header address of a memory area where the real node visualization object data 105 associated with the leaf node is stored. Specifically, as for vector data, an int pointer variable "*vector_data" indicates the header address of the real vector data, and, as for scalar data, int pointer variable "*scalar_data" indicates the header address of the real scalar data. Vector data and scalar data, which are the node visualization object data 105 are stored in a memory area (not illustrated) in a data configuration illustrated in FIG. 7, for example. In the example illustrated in FIGS. 4 to 8, the data size for one node is 125×125×125 pixels. Vector data is positioned at each pixel node as three-dimensional data, and hence, stored as 125×125×125×3 data. Scalar data is positioned at an element of each pixel, e.g., the center of a grid, and hence stored as 124×124×124 data, which is one less than the number of pixels for each axis. The header address pointing to data of each node is stored as a pointer variable, in the address table 106 illustrated in FIG. 5C, for example.

In FIG. 5C, "//degree of importance" indicates the maximum and minimum values of the vector data at the leaf node, using double variables NmagMax and NmagMin, as is specified by the data initial information illustrated in FIG. 4.

"//parent node header address" indicates the header address of the address table 106 of a node of a level directly above the level including the node, i.e., the parent node, using an int variable parent_address. Since a leaf node does not have a child node, "//child header address" does not exist in FIG. 5.

The node visualization object data 105, node coordinate data, and the like are associated with each leaf node using the address table 106 having the data configuration illustrated in FIG. 5C.

Next, in a loop of processing steps S304 to S311 illustrated in FIG. 3, the upper node setting unit 103 selects each level (i=s−1, . . . , 2, 1) starting from the level immediately above the bottom level, corresponding to the leaf node in the tree structure, in sequence up to the top level including the root node. The upper node setting unit 103, in a loop of processing steps S305 to S310, creates the node visualization object data 105, node coordinate data, and degree-of-importance data associated with each node (j=0, 1, . . . , Ni−1) included in the selected level in sequence. Here, "s" is the number of levels determined in step S301 and "Ni" is the number of nodes included in the selected level. In the example illustrated in FIGS. 4 to 8, s=3 and Ni=8 nodes at level 2, for example, which is one level above level 3 which is the bottom level, as illustrated in FIG. 8.

When a node of level 2 is selected in step S305, for example, the upper node setting unit 103 selects each child node corresponding to the selected node (S306). The upper node setting unit 103 refers to the address table 106 of each child node by referring to "//child node header address" in the address table 106 illustrated in FIG. 5B corresponding to the selected node.

Next, the upper node setting unit 103, by referring to the address table 106 of each of the selected child nodes, performs data reduction for the node visualization object data 105 of each node associated with the respective child node, and creates wide region visualization object data corresponding to the parent node (S307).

The upper node setting unit 103, by referring to "//current node data header address" of each node in the address table 106, reads the node visualization object data 105 associated with each child node. In the example illustrated in FIG. 8, one node of level 2 has eight child leaf nodes of level 3. Hence, the upper node setting unit 103 performs data reduction for the respective node visualization object data 105 associated with eight child nodes per one node of level 2 when processing is performed for level 2. As the data reduction, for example, the eight neighboring pixels among (125×2)×(125×2)×(125×2) pixel data included in the eight child nodes corresponding to one node of level 2 are replaced with one pixel. The methods of pixel replacement may include representing the eight pixels by the average of the eight data, selecting the maximum value as a representative value, or selecting the minimum value as a representative value. The node visualization object data 105 of each node of level 2 obtained by these kinds of pixel replacement becomes 125×125×125 pixel data representing a 0.5 m×0.5 m×0.5 m wide cubic region with a resolution of 250 pixels/m, since the node visualization object data 105 of level 3 is reduced to data with half the resolution. In other words, the resolution 250 of a visualized image represented by the node visualization object data 105 of a level 2 node is one half the resolution 500 of a visualized image represented by the node visualization object data 105 of a node of level 3, which is the bottom level corresponding to the leaf node.

Next, the degree-of-importance setting unit 104 generates degree-of-importance data indicating the degree of importance of the corresponding node based on the node visualization object data 105 or node coordinate data associated with a node of level 2 (S308).

Then, the upper node setting unit 103 associates the wide region visualization object data created in step S307, the information indicating the display position of the wide region, and the degree-of-importance data for the node with the selected node as the node visualization object data 105, node coordinate data, and degree-of-importance data of the selected node.

To store these node visualization object data 105, node coordinate data, and degree-of-importance data, the upper node setting unit 103 creates the address table 106 having the data configuration illustrated in FIG. 5B which are associated with, for example, each node of level 2 denoted by 2 in FIG. 6 (S309).

The data configuration of the address table 106 corresponding to a node of level 2 is nearly the same as the data configuration illustrated in 5C corresponding to a leaf node; however, the data configuration illustrated in FIG. 5B has "//child node header address". In "//child node header address", an int variable "child_address[8]" indicates the respective header addresses of the address tables 106 of the respective eight child nodes at the level below the level including the node. The child nodes of each node may be easily traced using "//child node header address" in a visualization process described below.

Referring to FIG. 8, note that the number by which the original visualization object data is divided on each axis at level 2 is double that in the case of level 1, and the number by which the original visualization object data is divided on each axis at level 3 is double that in the case of level 2. Hence, the region indicated by "//node coordinate data" corresponding to level 2 illustrated in FIG. 5B is double the region indicated by "//node coordinate data" corresponding to level 3 illustrated in FIG. 5C.

When the data creation corresponding to one node is finished by a sequence of processing steps S306 to S309, the next node at the same level is selected in step S305, and processing similar to the above-described processing is repeated, whereby data for each node is created.

When the creation of visualization object data for all the nodes at one level is finished, the level to be processed moves up by one level in step S304. In the example illustrated in FIG. 8, the processing at level 2 is followed by processing at level 1, which is the top level. Since the top level is a level corresponding to the root node, there is only a single root node at the top level. Hence, Ni has a value of one in step S305, and a sequence of processing steps S306 to S309 is executed only once for the root node.

Consequently, the upper node setting unit 103 creates the address table 106 having the data configuration illustrated in FIG. 5A which is associated with, for example, the root node of level 1 denoted by 1 in FIG. 6 (S309).

The data configuration of the address table 106 corresponding to the root node of level 1 is nearly the same as those illustrated in FIGS. 5B and 5C; however, the data configuration does not have "//parent node header address" since FIG. 5A corresponds to the root node. Note that the data configuration has "//child node header address" similarly to the intermediate node illustrated in FIG. 5B.

The node visualization object data 105 of the root node of level 1 obtained in this manner becomes 125×125×125 pixel data representing the whole 1 m×1 m×1 m cubic region with a resolution of 125 pixels/m, since the node visualization object data 105 of level 2 is reduced to data with half the resolution. In other words, the resolution 125 of a visualized image represented by the node visualization object data 105 of a level 1 node is a quarter of the resolution 500 of a visualized image represented by the node visualization object data 105 of a node of level 3, which is the bottom level corresponding to the leaf node.

When the creation of visualization object data up to the root node is finished in this manner, the processing performed by the structuring apparatus illustrated in FIG. 1 ends.

Figure 9:
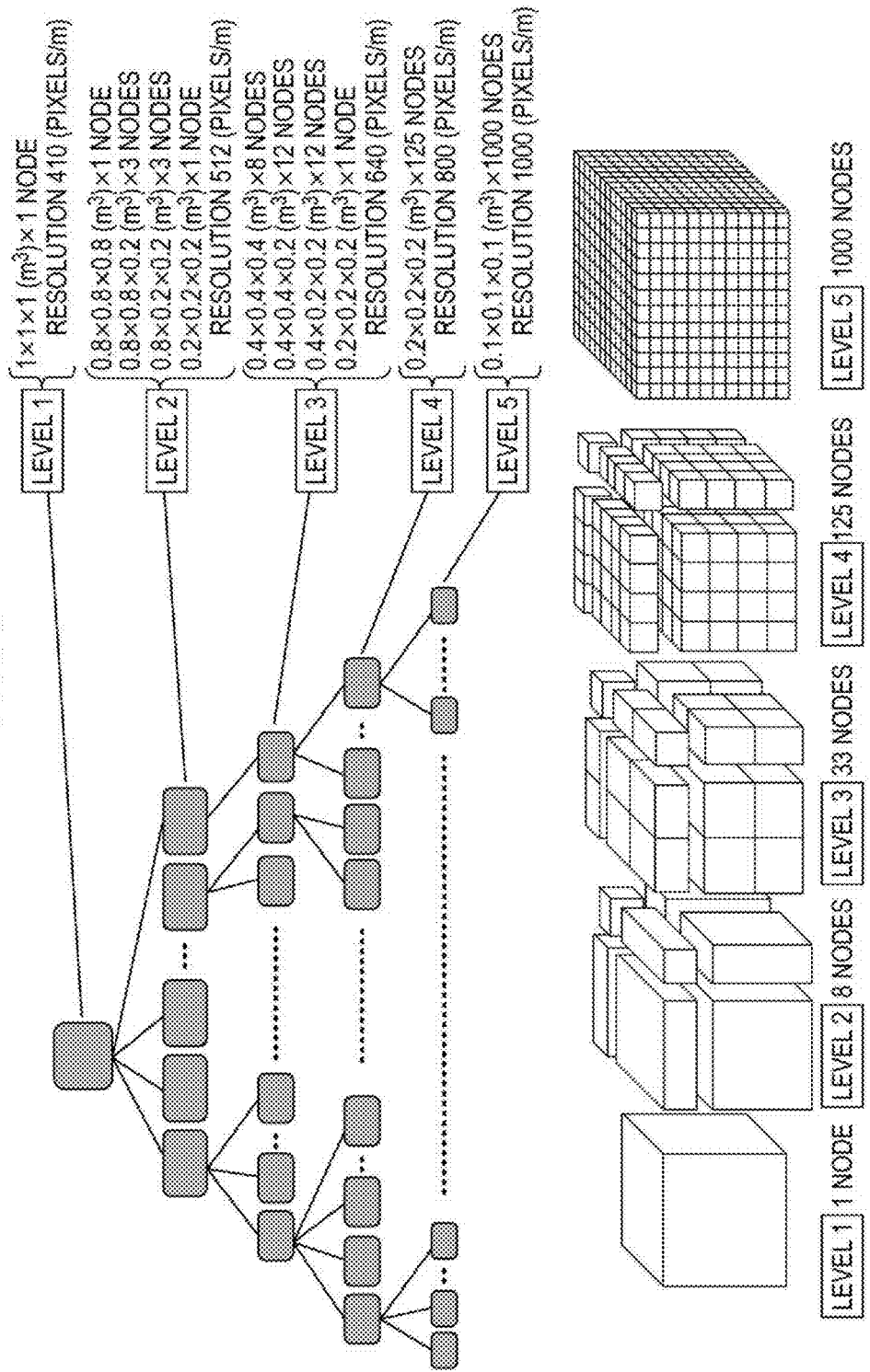
FIG. 9 illustrates an example of a tree structure with a tree depth of four or more.

FIG. 9 illustrates an example of a tree structure with a tree depth of four or more. In the example illustrated in FIG. 9, a tree structure is defined such that for 1 m×1 m×1 m data with a resolution of 1000 pixels/m, the depth of the tree, i.e., the number of levels in the tree structure is 5, the upper limit of the number of child nodes per parent node is eight, the resolution of each node is 80% of the resolution at the child level, and the minimum data size is 100×100×100 pixels.

More specifically, level 1 includes one node having a size of 1 m×1 m×1 m with a resolution of 410 pixels/m.

Level 2 includes one node having a size of 0.8 m×0.8 m×0.8 m, three nodes each having a size of 0.8 m×0.8 m×0.2 m, three nodes each having a size of 0.8 m×0.2 m×0.2 m, and one node having a size of 0.2 m×0.2 m×0.2 m. Each node has a resolution of 512 pixels/m.

Level 3 includes eight nodes each having a size of 0.4 m×0.4 m×0.4 m, twelve nodes each having a size of 0.4 m×0.4 m×0.2 m, twelve nodes each having a size of 0.4 m×0.2 m×0.2 m, and one node having a size of 0.2 m×0.2 m×0.2 m. Each node has a resolution of 640 pixels/m.

Level 4 includes 125 nodes each having a size of 0.2 m×0.2 m×0.2 m. Each node has a resolution of 800 pixels/m.

Level 5 includes 1000 nodes each having a size of 0.1 m×0.1 m×0.1 m. Each node has a resolution of 1000 pixels/m.

In this manner, various ways of dividing a tree structure may be defined in accordance with the characteristics of visualization object data.

Next, the operation of the visualization apparatus for visualization object data illustrated in FIG. 1B will be described in detail.

Figure 10:
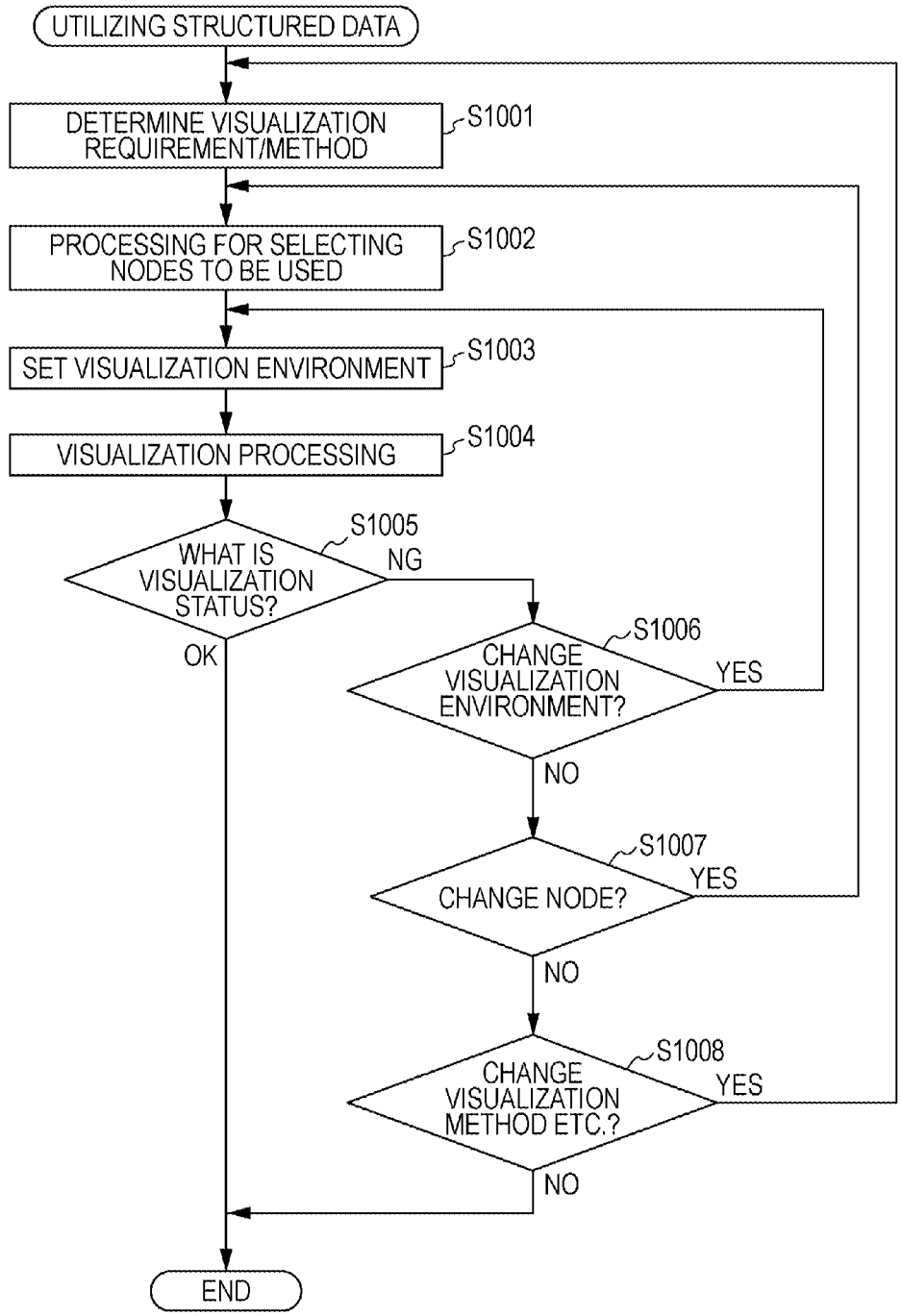
FIG. 10 is a flowchart of the entire operation of a visualization apparatus for structured visualization object data.
Figure 11:
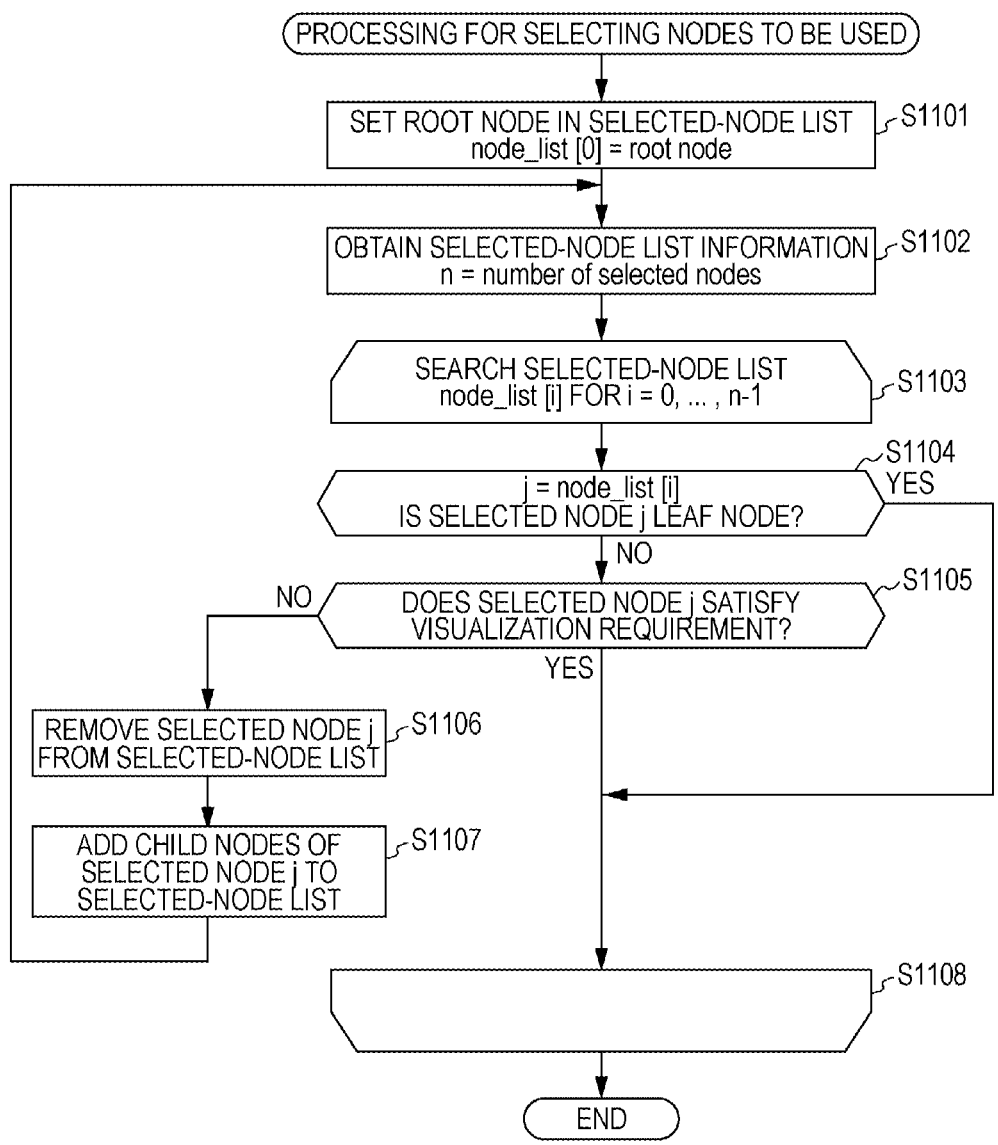
FIG. 11 is a flowchart of an operation for selecting nodes to be used.
Figure 12:
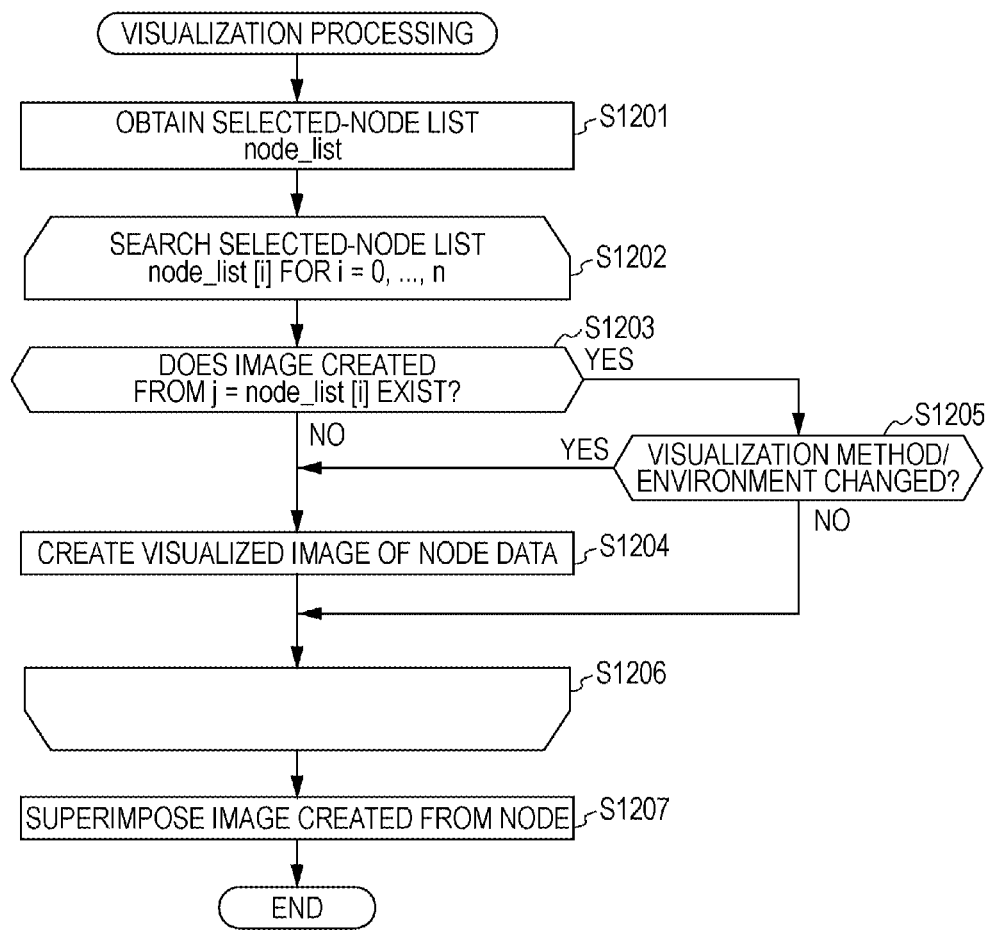
FIG. 12 is a flowchart of an operation for visualization processing.

FIGS. 10 to 12 are flowcharts of the operation of the visualization apparatus for visualizing the visualization object data structured by the structuring apparatus for visualization object data illustrated in FIG. 1A. Hereinafter, descriptions will be made with reference to the various portions illustrated in FIG. 1B and the respective steps illustrated in FIGS. 10 to 12.

First, the visualization requirement setting unit 107 sets a visualization method and a visualization requirement for visualization (S1001). The visualization method indicates a method of visualization processing, such as volume rendering illustrated in FIG. 13A. The visualization requirement indicates conditions for executing visualization, such as information that "the resolution must be "A" or higher if the variance is "x" or more", as illustrated in FIG. 13A. In the case where a visualization requirement is set, the variance of the node visualization object data 105 associated with a node has been computed and set as degree-of-importance data of the node. When the variance is x or more in a node of a certain level and the resolution at the level is less than A, visualization processing is not performed for the level, and instead, a node at a deeper level is searched for, where the visualization is performed.

The visualization requirement setting unit 107 sets a visualization requirement based on at least one of the coordinates of a visualization region, a resolution corresponding to the node, and a degree of importance corresponding to the node.

Then, the node-to-be-used selection unit 108 executes the following processing for selecting a node to be used (S1002). This is processing for selecting nodes as nodes to be used for visualization. In this processing, the node-to-be-used selection unit 108 sequentially determines nodes to be selected for use starting from the root node toward the leaf nodes. Next, the node-to-be-used selection unit 108 determines whether or not the selected node satisfies the visualization requirement. Then, when it is determined that the selected node is a leaf node or satisfies the visualization requirement, the node-to-be-used selection unit 108 registers the selected node in a selected-node list for registering nodes used for creating a visualized image, and returns control to the processing for determining the next node to be selected. When it is determined that the selected node does not satisfy the visualization requirement, the node-to-be-used selection unit 108 replaces the selected node not satisfying the requirement with a child node of the selected node and returns control to the processing for determining the next node to be selected, where the respective child nodes are new candidates for nodes to be selected. The node-to-be-used selection unit 108 outputs the selected-node list and terminates the processing when there are no more nodes to be processed for selection.

FIG. 11 illustrates a detailed flowchart of the processing performed in step S1002 illustrated in FIG. 10.

First, the node-to-be-used selection unit 108 sets the root node in a selected-node list 110 (S1101). Here, when the selected-node list 110 is represented by "node_list", "node_list[0]=root node" in step S1003.

Next, the node-to-be-used selection unit 108 obtains the number of list elements of the selected-node list 110 as the number (n) of nodes to be selected (S1102).

Then, in the repeated processing steps S1103 to S1108, the node-to-be-used selection unit 108 sequentially searches the selected-node list 110 for a list element value "node_list[i]" by changing a variable i indicating the element number of the selected-node list 110 from i=0 to i=n−1 (S1103).

Then, the node-to-be-used selection unit 108 determines whether or not a selected node j is a leaf node where "j=node_list[i]" (S1104). The node-to-be-used selection unit 108 determines that the selected node j is a leaf node when the node-to-be-used selection unit 108, by reading the address table 106 corresponding to the selected node j, finds that "//child node header address" does not exist in the address table 106, as illustrated in FIG. 5C.

When the selected node j is a leaf node, and hence, the determination result in step S1104 is Yes, the node-to-be-used selection unit 108 leaves the selected node j as is in the selected-node list 110 as "node_list[i]", and the flow goes back to the processing steps S1108 to S1103.

When the selected node j is not a leaf node, and hence, the determination result in step S1104 is No, the node-to-be-used selection unit 108 determines whether or not the selected node j satisfies the visualization requirement (S1105). The node-to-be-used selection unit 108 reads node coordinate data or degree-of-importance data from the address table 106 corresponding to the selected node j. The node-to-be-used selection unit 108 also recognizes the resolution of the level to which the selected node j belongs. Then, the node-to-be-used selection unit 108 determines whether or not the selected node j satisfies the visualization requirement by comparing the node coordinate data, degree of importance data, or resolution data with the visualization requirement determined in step S1001 illustrated in FIG. 10.

When the selected node j satisfies the visualization requirement, and hence, the determination result in step S1105 is Yes, the node-to-be-used selection unit 108 leaves the selected node j as is in the selected-node list 110 as "node_list[i]", and the flow goes back to the processing steps S1108 to S1103.

On the other hand, when the selected node j does not satisfy the visualization requirement, and hence, the determination result in step S1105 is No, the node-to-be-used selection unit 108 first removes the selected node j from the selected-node list 110 (S1106).

Then the node-to-be-used selection unit 108 extracts child nodes of the selected node j using "//child node header address" (refer to FIG. 5A or 5B) in the address table 106 and adds the extracted child nodes to the selected-node list 110 (S1107).

Then, the node-to-be-used selection unit 108 returns control to step S1102, and a sequence of processing steps S1103 to S1108 is repeatedly executed for the selected-node list 110 in which the number of selected nodes has changed to a new n by addition of the new nodes for selection.

For instance, assume that, as illustrated in FIG. 13B, the tree structure is set in which level 1 includes the root node, level 2 includes four nodes: child nodes 1 to 4, and level 3 includes sixteen nodes: child nodes 5 to 20. It is also assumed that the resolution of level 1 is resolution[0], the resolution of level 2 is resolution[1], and the resolution of level 3 is resolution[2].

Referring to FIG. 13C, the root node is registered in the selected-node list 110 in step S1101 illustrated in FIG. 11.

Then, referring again to FIG. 13C, it is determined in step S1105 illustrated in FIG. 11 whether or not the root node satisfies the visualization requirement illustrated in FIG. 13A. Here, when it is assumed, for example, that the variance dev[0] of the root node is larger than a variance determination value x, and the resolution, resolution[0], of the top level including the root node is smaller than a resolution determination value A, the root node does not satisfy the visualization requirement.

Consequently, referring to FIG. 13D, the root node is removed from the selected-node list 110, and instead, child nodes 1 to 4, which are the child nodes of the root node, are added to the selected-node list 110.

Then it is determined in step S1105 illustrated in FIG. 11 whether or not child nodes 1 to 4 newly registered in the selected-node list 110 as selected nodes each satisfy the visualization requirement illustrated in FIG. 13A.

Here, it is assumed that the resolution, resolution[1], is smaller than the determination value A, and the respective variances dev[1], dev[2], and dev[4] of child 1, child 2, and child 4 are smaller than the determination value x, and only the variance dev[3] of child 3 is larger than the determination value. In this case, as illustrated in FIG. 13E, only child 3 with the variance dev[3] larger than the determination value x, is removed. Then, instead of child 3, children 13 to 16, which are the children of child 3, are added to the selected-node list 110 in step S2106 illustrated in FIG. 11. These new nodes, since they are leaf nodes, are kept in the selected-node list 110 for visualization together with child 1, child 2, and child 4 each having a variance of the determination value or less.

In this manner, based on the set visualization requirement, a deeper level is searched in the case of a node having a large variance and an insufficient resolution, whereby the resolution set as a visualization requirement is assured.

By the processing illustrated in FIG. 11 described above, nodes used for visualization are obtained as the selected-node list 110 in step S1002 illustrated in FIG. 10.

Next, the visualization processing unit 109 illustrated in FIG. 1 sets a visualization environment (S1003). Visualization environment means environment information for visualization such as a camera position and the direction of illumination for a visualized image, and the visualization processing unit 109 performs visualization based on the visualization environment settings.

Next, the visualization processing unit 109 performs visualization processing (S1004). FIG. 12 is an operation flowchart describing details of the processing performed in step S1004.

First, the visualization processing unit 109 obtains the array data "node_list" created in step S1002 (S1201).

Then, in the repeated processing steps S1202 to S1206, the visualization processing unit 109 sequentially searches the selected-node list 110 for "node_list[i]" by changing i=0 to n (S1202).

Then, the visualization processing unit 109 determines whether or not a visualized image created from the selected node j exists in an image memory (not illustrated), where "j=node_list[i]" (S1203).

When no visualized image created from the selected node j exists, and hence the determination result in step S1203 is No, the visualization processing unit 109 accesses the node visualization object data 105 using "//current data header address" in the address table 106 corresponding to the selected node j, and creates a visualized image based on the obtained node visualization object data (S1204). After that, the visualization processing unit 109 goes back to the processing of step S1202 from step S1206, and performs visualization processing for the next selected node.

On the other hand, when a visualized image created from the selected node j exists, and hence the determination result of step S1203 is Yes, the visualization processing unit 109 determines whether or not the visualization method or visualization environment regarding the selected node j has been changed (S1205).

When the visualization method or visualization environment regarding the selected node j has been changed, and hence the determination result of step S1205 is Yes, it is preferable to update the visualized image corresponding to the selected node j, that is, re-rendering is preferable. Hence, the visualization processing unit 109 accesses the node visualization object data 105 using "//current data header address" in the address table 106 corresponding to the selected node j, and creates a visualized image based on the obtained node visualization object data (S1204). After that, the visualization processing unit 109 goes back to the processing of step S1202 from step S1206, and performs visualization processing for the next selected node.

When the visualization method or visualization environment regarding the selected node j has not been changed, and hence the determination result of step S1205 is No, it is not necessary to update the visualized image corresponding to the selected node j. Hence, the visualization processing unit 109 goes back to the processing of step S1202 from step S1206 and performs visualization processing for the next selected node.

Figure 14A:
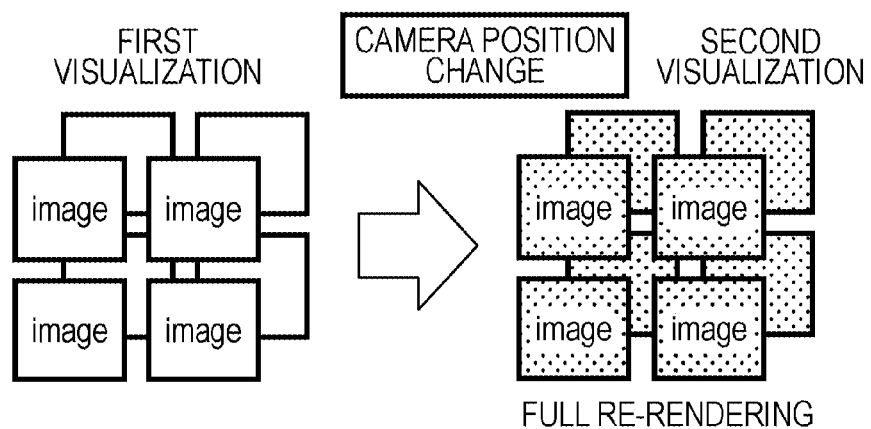
FIGS. 14A and 14B are explanatory illustrations showing partial visualization processing.

Referring to FIG. 14A, when a change in the camera position affects all the nodes for example, re-rendering is performed for all the nodes and all the visualized images are created again.

Figure 14B:
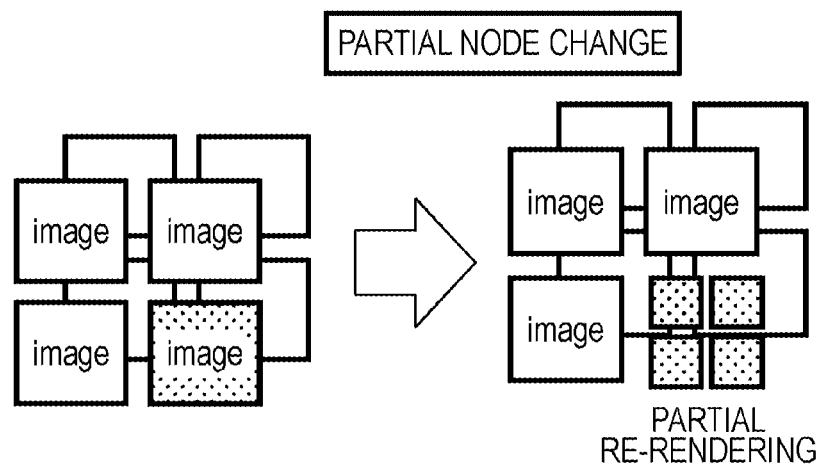

On the other hand, when the resolution and the like are changed for part of the nodes as illustrated in FIG. 14B, a visualized image is created again by re-rendering only for the nodes whose resolution has been changed.

In this manner, the present embodiment allows efficient visualization to be realized.

After the visualization processing unit 109 has performed visualization through visualization processing of step S1004 illustrated in FIG. 10 in accordance with the operation flowchart illustrated in FIG. 12, the visualization processing unit 109 asks a user whether or not the visualization status is appropriate (S1005).

When the user replies "OK" for the visualization status, the visualization processing unit 109 finishes the control processing illustrated in FIG. 10.

When the user replies "NG" for the visualization status, the visualization processing unit 109 determines whether or not changing of the visualization environment has been instructed by the user (S1006).

When changing of the visualization environment has been instructed by the user, and hence the determination result in step S1006 is Yes, a visualization environment changing instruction unit 111 illustrated in FIG. 1 causes the visualization processing unit 109 to change the visualization environment for visualization (S1003). Hence, the visualization processing is performed again.

When changing of the visualization environment has not been instructed by the user, and hence the determination result in step S1006 is No, the visualization processing unit 109 determines whether or not the user has instructed changing of the node to be used (S1007).

When changing of the node to be used has been instructed by the user, and hence the determination result in step S1007 is Yes, a node-to-be-used changing instruction unit 112 illustrated in FIG. 1 instructs changing of a node used for visualization and updates the visualization requirement. Then, the node-to-be-used changing instruction unit 112 causes the node-to-be-used selection unit 108 to perform processing again (S1002) using the updated visualization requirement, and also causes the visualization processing unit 109 to perform visualization again.

When changing of the node to be used has not been instructed by the user, and hence the determination result in step S1007 is No, the visualization processing unit 109 determines whether or not changing of the visualization method or the visualization requirement has been instructed by the user (S1008).

When changing of the visualization method or the visualization requirement has been instructed by the user, and hence the determination result in step S1008 is Yes, a visualization method/requirement changing instruction unit 113 instructs changing of the visualization method or the visualization requirement, and causes the visualization requirement setting unit 107 to perform processing again (S1001). Consequently, the node-to-be-used selection unit 108 and the visualization processing unit 109 are caused to perform processing again based on a new visualization requirement, whereby visualization processing is performed again.

When changing of the visualization method or the like has not been instructed by the user, and hence the determination result in step S1008 is No, the visualization processing unit 109 finishes the control processing illustrated in FIG. 10.

As has been described above, the present embodiment realizes efficient visualization based on visualization object data having a tree structure, importance data, visualization requirement, and the like.

In the present embodiment, high-resolution data may also be selected locally. For example, in the case of data including a high percentage of data having a scalar value of zero, by setting a visualization requirement "the parent node of a selected node is to have a scalar value other than zero", it becomes possible to reduce the amount of information of a local region that is made up of only zero, while keeping the precision of the data.

Similarly, by using the standard deviation or the like of scalar values, it may be possible to select a node in such a manner that rough data is obtained for a region having scalar values with a small deviation and detailed data is obtained for a region having scalar values with a large deviation.

Further, it is easy to access data having a high resolution from any node based on a degree of importance. Consequently, re-visualization is possible by reading detailed data of only some regions after visualization. Note that a configuration may be used in which, when a user specifies a certain node, the parent node thereof is selected, whereby an access from any node to data having a lower resolution becomes possible.

Since it is no longer necessary to read all the data every time re-visualization is performed, visualization with a higher interactivity is realized.

Thus, having a tree structure allows region data with various levels of precision to be obtained without data reconfiguration.

Further, the degree-of-importance data included in a node may be utilized not only as a criterion at node selection, but also at the time of setting a visualization method, such as setting a camera position or a color table at the time of visualization. An example of determining a camera position will be described. The focus point of a camera is set at the center of an object to be visualized. The center of gravity of the object is computed based on degree-of-importance data and node coordinate data, and the camera position is set at a point on a line connecting the focus point and the center of gravity beyond the center of gravity. Alternatively, the center of gravity may be simply replaced with the center of the node having the maximum degree of importance. By making the camera face a region having a high degree of importance in this manner, a visualization result in which a user may be more interested in is obtained.

In the embodiment described above, the structured data having a tree structure is configured by creating the address table 106 configured to include a structure, and accessing desired data using a pointer stored in the address table 106. However, a configuration may be used in which the address table is configured to include only a list representing a tree structure and a pointer to the node visualization object data 105 included in the tree, and a structure that stores node coordinate data and degree-of-importance data is provided at a place accessed via the pointer.

Further, although the selected-node list 110 in the present embodiment stores selected nodes using a list structure, the list structure may be replaced with an array or flags set in the tree structure.

Figure 15:
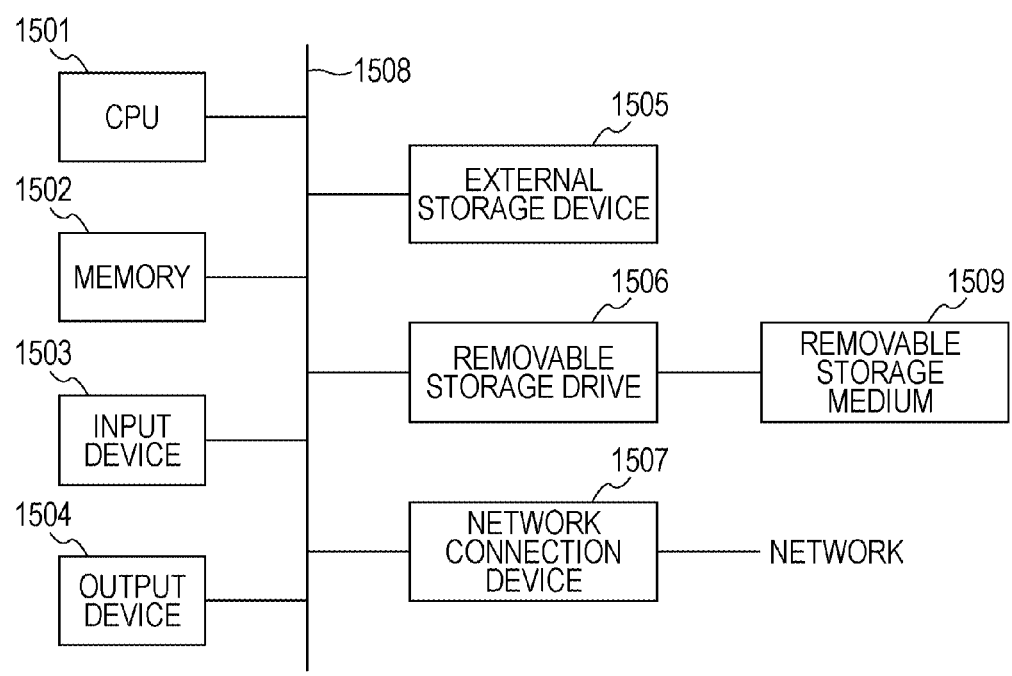
FIG. 15 is a block diagram illustrating an example hardware configuration of a computer that realizes the apparatus according to the present embodiment.

FIG. 15 illustrates an example hardware configuration of a computer that realizes the apparatus illustrated in FIGS. 1A and 1B.

The computer illustrated in FIG. 15 includes a CPU 1501, a memory 1502, an input device 1503, an output device 1504, an external storage device 1505, a removable storage drive 1506 in which a removable storage medium 1509 is mounted, and a network connection device 1507, which are connected to one another via a bus 1508. The configuration illustrated in FIG. 15 is an example of a computer that realizes the above system, and such a computer is not limited to the configuration illustrated in FIG. 15.

The CPU 1501 performs overall control of the computer. The memory 1502 is a memory, such as a RAM, temporarily storing a program or data stored in the external storage device 1505 (or on the removable storage medium 1509) when the program is executed or the data is updated. The CPU 1501 performs overall control of the computer by executing a program read into the memory 1502.

The input device 1503 corresponds to a keyboard, a mouse or the like, and the interface control unit thereof. The input device 1503 detects a user's input operation through a keyboard or mouse and notifies the CPU 1501 of the detection result of the input operation.

The output device 1504 corresponds to a display, a printer, or the like, and the interface control unit thereof. The output device 1504 outputs data received under the control of the CPU 1501 to a display or a printer.

The external storage device 1505 is, for example, a hard disk drive. The external storage device 1505 is mainly used for storing various data and programs.

The removable storage drive 1506 is used to mount the removable storage medium 1509, such as an optical disc, an SDRAM, CompactFlash (registered trademark), and performs the same function as the external storage device 1505 in an auxiliary manner.

The network connection device 1507 is used to connect communication lines such as a local area network (LAN) and a wide area network (WAN).

The system according to the present embodiment is realized by the CPU 1501 executing a program that provides the functions desired by the respective blocks illustrated in FIG. 1. The program may be distributed by being recorded on the external storage device 1505 or the removable storage medium 1509, or may be obtained from a network via the network connection device 1507.

The disclosed technique may be utilized by an apparatus for visualizing a scientific and engineering computation result of meteorological forecasting, three dimensionally displaying CAD design data, and the like.

What is claimed is:

1. A structuring apparatus for processing visualization object data, the apparatus comprising:
    a memory; a processor coupled to said memory, the processor comprising:
    a tree structure defining unit configured to define a tree structure of a visualization object;
    a leaf node setting unit configured to divide the visualization object data based on numerical data corresponding to a number of leaf nodes at a bottom level of the tree structure that includes the leaf nodes, into visualization object data of a plurality of local regions, and to associate the visualization object data of the local regions and information indicating positions of the local regions in the visualization object with the leaf nodes as visualization object data and node coordinate data of the leaf nodes corresponding to the local regions;
    an upper node setting unit configured to sequentially select each level of the tree structure from a level immediately above a bottom level to a top level and to sequentially select nodes included in the selected levels, configured to create visualization object data of a wide region including respective local regions corresponding to child nodes from node visualization object data associated with the respective child nodes which belong to a level immediately below a level including the selected nodes and which are nodes connected by the tree structure to the selected nodes, and configured to associate the visualization object data of the wide region and information indicating a display position of the wide region with the selected nodes as the node visualization object data and the node coordinate data; and
    a degree-of-importance setting unit configured to create degree-of-importance data indicating a degree of importance of the node based on the node visualization object data or the node coordinate data associated with the node for each node of the respective levels, and to associate the degree-of-importance data with the node.

2. The structuring apparatus for processing visualization object data according to claim 1, the apparatus further comprising:
    an address table configured to store actual data or memory address reference data of the node visualization object data, the node coordinate data, or the degree-of-importance data associated with the node, for each of the nodes.

3. A method of structuring visualization object data, the method comprising:
    defining, by a processor, a tree structure of a visualization object;
    dividing, at a bottom level including leaf nodes, the visualization object data based on numerical data into visualization object data of a plurality of local regions in accordance with the number of the leaf nodes;
    associating the visualization object data of the local regions and information indicating the positions of the local regions in the visualization object with the leaf node as visualization object data and node coordinate data of the leaf nodes corresponding to the local regions;
    selecting sequentially each level from a level immediately above a bottom level to a top level;
    selecting sequentially nodes included in the selected levels and creating, from node visualization object data associated with respective child nodes which belong to a level immediately below a level including the selected node and which are nodes connected by the tree structure to the selected nodes, visualization object data of a wide region including respective local regions corresponding to the child nodes;
    associating the visualization object data of the wide region and information indicating a display position of the wide region with the selected nodes as node visualization object data and node coordinate data; and
    creating, for each node of the respective levels, degree-of-importance data indicating a degree of importance of the node based on the node visualization object data or node coordinate data associated with the node, and associating the degree-of-importance data with the node.

* * * * *